United States Patent [19]

Nelson

[11] 3,731,551
[45] May 8, 1973

[54] LUBRICATION SEAL FOR A CRAWLER TRACK

[76] Inventor: Bill W. Nelson, P.O. Box 212, Wasilla, Alaska 99687

[22] Filed: May 6, 1971

[21] Appl. No.: 140,701

[52] U.S. Cl. .................................................74/257
[51] Int. Cl. ...........................................F16g 13/02
[58] Field of Search.........................................74/257

[56] References Cited

UNITED STATES PATENTS

| 3,336,089 | 8/1967 | Krickler | 74/257 X |
| 3,365,246 | 1/1968 | Otis et al. | 74/257 X |
| 3,178,239 | 4/1965 | Zeller | 74/257 X |
| 2,622,449 | 12/1952 | Barker | 74/257 |

*Primary Examiner*—Charles J. Myhre
*Assistant Examiner*—Frank H. McKenzie, Jr.
*Attorney*—Thomas W. Secrest

[57] ABSTRACT

A track for a crawler vehicle comprises track assemblies. The adjacent or successive track assemblies are connected together by a bushing and a pin in the bushing. The bushing and pin are free to rotate with respect to each other.

The bushing and pin, because of their relative movement with respect to each other, wear. The metal to metal contact of the bushing and pin wear each other. Also, the track in a crawler vehicle moves over and through dirt, mud and in muddy water. The dirt, mud and silt and the muddy water work in between the bushing and the pin. As a result, there is considerable wear between the bushing and the pin. Consequently, there is a shortened life for the track.

This invention is directed to a lubrication system for the bushing and the pin. This lubrication system decreases the wear between the bushing and the pin and, consequently, lengthens the life of the track.

14 Claims, 6 Drawing Figures

INVENTOR
BILL W. NELSON
BY
THOMAS W. SECREST
ATTORNEY

PATENTED MAY 8 1973 3,731,551

INVENTOR
BILL W. NELSON
BY
THOMAS W. SECREST
ATTORNEY

LUBRICATION SEAL FOR A CRAWLER TRACK

I have worked with crawler equipment having tracks, I have owned crawler equipment having tracks and I own crawler equipment having tracks.

The wear and tear on the track, in many instances is not necessary. It is my feeling that with proper modification of the track that it is possible to lessen the wear and tear of the track.

The track assembly consists essentially of two spaced apart links joined by a bushing at one end and at the other end joined by a pin. In succeeding or adjacent track assemblies, the pin at one end is placed in the bushing in the other end. The bushing and pin are free to rotate with respect to each other so that the track may pass around the sprocket.

With the pin and the bushing there is a metal to metal contact. With the crawler vehicle moving and the track running around the sprockets, there is generated considerable noise. Further, there is considerable wear of the pin and bushing due to this metal to metal contact.

As is readily appreciated, a crawler type vehicle works in many conditions such as on dry earth, on moist earth, in mud, and in water having fine silt suspended in the water. The dry earth, sand, mud with silt act as abrasives and the continual running of the crawler type vehicle with the link assembly means that the sane or fine material in the water or mud is in an abrasive position with respect to the pin and the bushing in the link assembly. This abrasiveness of the fine solid material increases the wear of the pin and the bushing. This increased wear is due to this fine solid material working between the pin and the bushing. Another source of wear is a dry metal-to-metal contact between the pin and the bushing, under high load conditions. As a result, the life of a link assembly is decreased because of this abrasiveness. Further, with the wearing of the links, the links do not fit the cogs of the sprocket wheel properly. There results one or two links doing the work of what six to nine links should normally be doing on the crawler track. These factors, compounded, decrease the life of the crawler track. Further, with this uneven wear on the link assemblies, even though there is sufficient structural support in the link assembly, the user of the crawler tractor is afraid to use the tractor in all situations because there is a possibility that the link assembly and the track will come off of the drive train or be thrown off of the drive train.

In terms of cost, the replacement of a set of link assemblies on a large crawler vehicle, such as a D-8 on equivalent crawler vehicle, will be in the range of approximately $10,000.00 for the complete running gear. In one season of difficult construction work, for example, in Alaska, it may be necessary to have one complete replacement. Under exceptional circumstances, where the running gear is in mud or in a high abrasive material such as silt and water, it may be necessary to have two or three complete replacements.

This background, and having worked with heavy construction equipment using crawler type vehicles, I have an appreciation of some of the problems, and also an appreciation of the cost involved. Therefore, I have invented a lubrication system for the link assemblies. Briefly, in the track there is a first track assembly and a second track assembly. In the first track assembly there is a passageway with a bushing positioned in the passageway. Part of the second track assembly is recessed to receive the end of the bushing. My invention comprises recessing parts of the links around the bushing in both the first track assembly and the second track assembly and placing a flexible seal in the recesses. Then, the pin is drilled to have a first passageway so as to be able to introduce a lubricant from the end of the pin to the circumference of the pin inside of the bushing. In the end of the pin there is positioned a grease fitting. A lubricant such as a suitable grease may be forced into the passageway and further into the space between the pin and the bushing. The seal prevents extraneous material such as dirt, silt and the like working its way in between the pin and the bushing. Further, the grease is under pressure and tends to keep extraneous material from working between the pin and the bushing. In this manner I plan to lessen the wear between a pin and a bushing in the track.

An object of this invention is to provide a lubrication system for a track and which lubrication system will increase the life of the track; a further object is to provide a lubrication system for a track and which lubrication system will allow the track to run more quietly or to make less noise while running; an additional object is to provide a method for making an inexpensive modification of existing track for crawler vehicles so as to be able to be readily lubricated; a still further object is to provide a lubrication system for a crawler track and which crawler track requires less maintenance because of this lubrication system; a still further and important object is to provide a lubrication system for a track or crawler vehicle and which lubrication system makes it less expensive to operate the crawler vehicle than with previously available track as it is not necessary to replace the track assembly or assemblies so often as previously required.

These and other important objects and advantages of the invention will be more particularly brought forth upon reference to the accompanying drawings, the detailed description of the invention and the appended claims.

Figure 2:
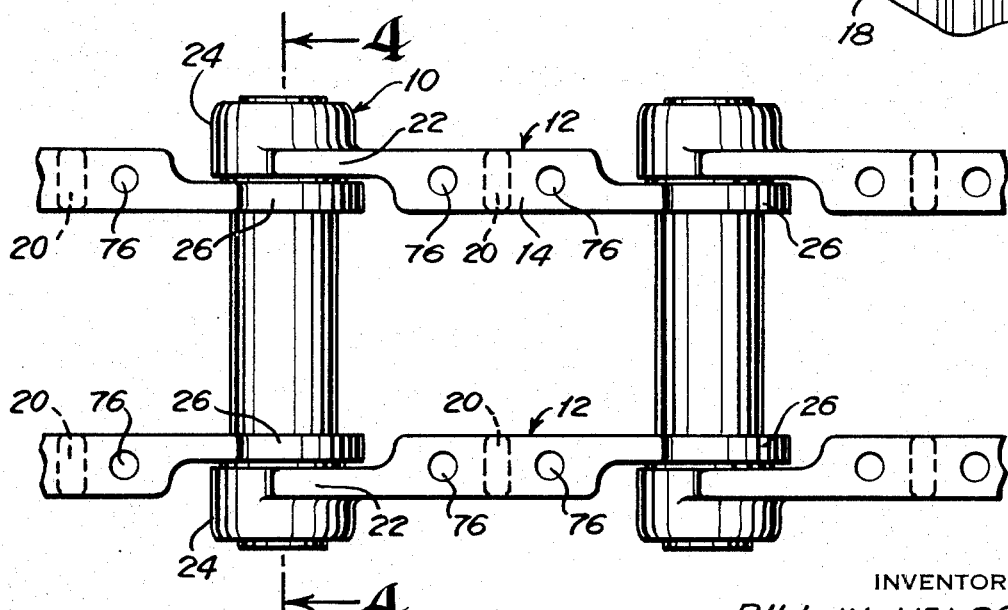
FIG. 2 is a plan view illustrating a central track assembly connecting with part of track assemblies on both ends.
Figure 4:
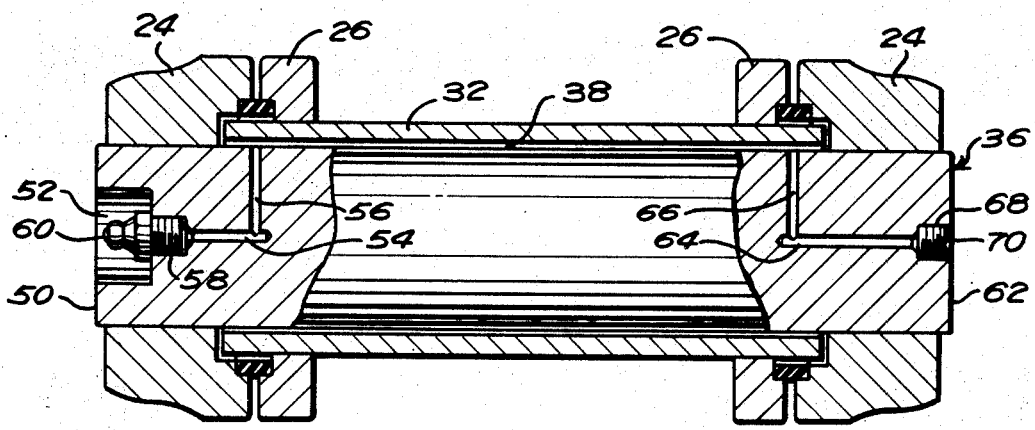
Figure 5:
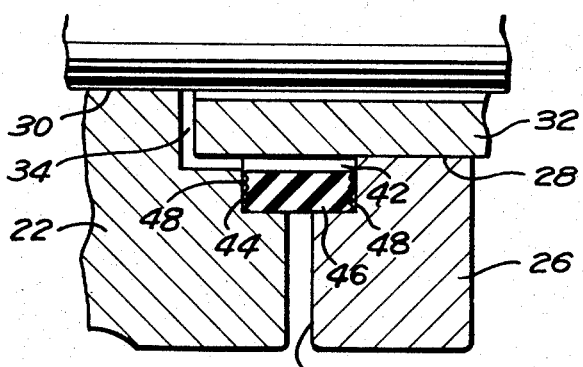
Figure 6:

FIG. 4, taken on line 4—4 of FIG. 2, is a longitudinal vertical cross-sectional view illustrating the pin in a bushing for connecting together two track assemblies, the seal between the two track assemblies and for preventing the entrance of extraneous material between the pin and the bushing, and the lubrication system for introducing lubricant between the pin and the bushing;

FIG. 5 is a fragmentary enlarged view illustrating a portion of the bushing, the pin in the bushing, the recesses in the links and the flexible seal positioned in the recesses and between the links;

FIG. 6 is a lateral cross-sectional view illustrating the flexible seal in a normal configuration.

In FIG. 2 there is illustrated a track assembly 10.

The track assembly 10 comprises two spaced-apart links 12. Each link 12 has a main body portion 14 comprising an inner rail 16 and an outer rail 18. There extends between the two rails 16 and 18 a bracing rib or a supporting rib 20.

On one end of the links 12 there is an overlapping link 22 having a hub 24.

On the other end of the link 12 there is an inside link 26.

In FIGS. 2 and 4 it is seen that in a track the distance between the inner surfaces of the two spaced apart overlapping links 22 is greater than the distance between the outside surfaces of the two spaced apart inside links 26. This is so that the inside links 26 may fit inside of the overlapping links 22.

In FIGS. 4 and 5 it is seen that in the inside link 26 that there is a passageway or drilled hole 28. Likewise, in the overlapping link 22 and the hub 24 there is a passageway or drilled hole 30.

It is seen that a bushing 32 is pressed into the passageways 28 in the inside links 26. Also, it is seen in FIGS. 4 and 5 that the bushing 32 extends out and beyond the inside links 26. Therefore, the overlapping link 24 is recessed at 34 to receive the end of the bushing 32.

The bushing 32 joins together the link 12 at the inside links 26 of the track assembly 10.

A pin 36 is pressed into the passageway 30 of the overlapping link 22 and the hub 24. Actually, the pin 36 is pressed through the openings or passageways 30 and through the bushing 32.

The bushing 32 has a passageway 38. The internal diameter of the passageway 38 is greater than the external diameter of the pin 36. Therefore, the bushing 32 and the pin 36 can rotate relative to each other.

The fit between the bushing 32 and the inside links 26 is a press fit. Likewise, the fit between the pin 36 and the two spaced apart overlapping links 22 and hubs 24 is a press fit.

In FIG. 5 it is seen that the outside surface 40 of the inside link 26 is stepped and recessed at 42. Also, the inside surface of the overlapping link 22 is stepped and recessed at 44. In the recesses 42 and 44 there is positioned a flexible seal 46. The flexible seal 46 extends between the inside link 26 and the overlapping link 22.

Further, it is seen in FIG. 5 that the outside edges 48 of the flexible seal 46 are roughened or corrugated or curved so as to provide greater friction between the seal 48 and the surfaces of the recesses 42 and 44.

In FIG. 4 there is illustrated the pin 36. In the outside end 50 of the pin 36 there is a recess 52.

There extends from the recess 52 a longitudinal passageway 54 into the main body of the pin 36. Then, at right angles to the passageway 54 there is a radial passageway 56. The radial passageway 56 connects with the passageway 54 and also with the circumference of the pin 36. The radial passageway 56 connects with the circumference of the pin 36 inside of the bushing 32. Or to phrase this differently, the passageway 56 connects with the circumference of the pin 36 between the recess 34 in the overlapping link 22 and the hub 24. This is so as to allow a lubricant to be forced between the pin 36 and the bushing 32.

The outer end of the passageway 54 is enlarged and threaded and tapped at 58. There is positioned in the threaded tapped passageway 58 a grease fitting 60.

In the other end 62 of the pin 36 there is a longitudinal passageway 64. Also, in the pin 36 there is a radial passageway 66 which connects with the longitudinal passageway 64 and the circumference of the pin 36. The radial passageway 66 connects with the circumference of the pin 36 inside of the bushing 32. Or, to phrase it another way, the radial passageway 66 connects with the circumference of the pin 36 between the recesses 34 in the overlapping links 22 and the hubs 24.

The outer end of the passageway 64 is expanded and tapped at 68 to receive a pressure release fitting 70.

The lubricant, an industrial grease, may be introduced through the grease fitting 60 and into the passageways 54 and 56 and between the pins 36 and the bushing 38. The seal 46 will prevent the lubricant or industrial grease from escaping between the inside link 26 and the overlapping link 22. If the pressure of the lubricant between the pin 36 and the bushing 32 becomes too great, there is a possibility of blowing the seal 46 or forcing the seal 46 out of the recesses 42 and 44. To preclude this, there is used the pressure release fitting 70. If the pressure becomes too great, then the pressure release fitting will allow the industrial grease or lubricant to escape through the passageways 66 and 64 and through the fitting 70. For example, the pressure release fitting 70 may be set so as to allow grease at 5 pounds per square inch pressure to escape or, at a higher pressure at say 10 pounds per square inch, to escape. In this manner, the seals 46 are not forced out of their position in the recesses 42 and 44 between the inside link 26 and the overlapping link 22.

The flexible seals 46 prevent dirt, mud, sand, and silt in muddy water and the like from working between the bushing 32 and the pin 36. This decreases the abrasive wear of the bushing 32 and the pin 36. Further, with the industrial grease or lubricant between the pin 36 and the bushing 32, there is less metal to metal contact and less wear. With less wear, there is less maintenance of the track. With less wear and less maintenance of the track there is less expense in maintaining the track in running order as fewer parts are required to replace worn parts and, also less labor is required to repair worn tracks. In addition, with the lubricant or industrial grease under pressure between the bushing 32 and the pin 36 there is an outward pressure which prevents or decreases the possibility of dirt, mud, sand and silt in muddy water working between the bushing 32 and the pin 36. Consequently, there is less abrasive wear between the bushing 32 and the pin 36.

The seal 46 may be an O-ring. Preferably, the seal, in a lateral, cross-sectional configuration, may have an hour-glass configuration with flat ends, see FIG. 6. Then, when the two link assemblies are forced together, the seal appears to be of a substantially rectangular configuration in the lateral cross-sectional view, see FIG. 4 or FIG. 5.

The seal 46 may be of many appropriate materials such as neoprene, polyurethane, tetrafluoropolyethylene, and other suitable materials which will withstand the action of lubricants, petroleum and abrasive materials such as mud, earth, silt and sand. The seal must be flexible and be capable of yielding to a small degree. For example, the link assemblies upon going around the sprocket go through an angle of approximately one hundred eighty (180°) degrees. The number of link assemblies required to go through this angle of one hundred eighty (180°) degrees will be approximately eight to 10 or 11 link assemblies. Therefore, the largest angle for the link assembly will be approximately twenty-two and one-half (22½°) degrees. The seal must be sufficiently internally flexible to yield to this twenty-two and one-half (22½°) degree angle.

In certain instances, it may be desirable to have a rough finish on the ends of the seal or a rough finish in the recesses of the offset screws in the link assemblies so as to fixedly position the seal and to transfer the stresses to the internal structure of the seal.

Figure 1:
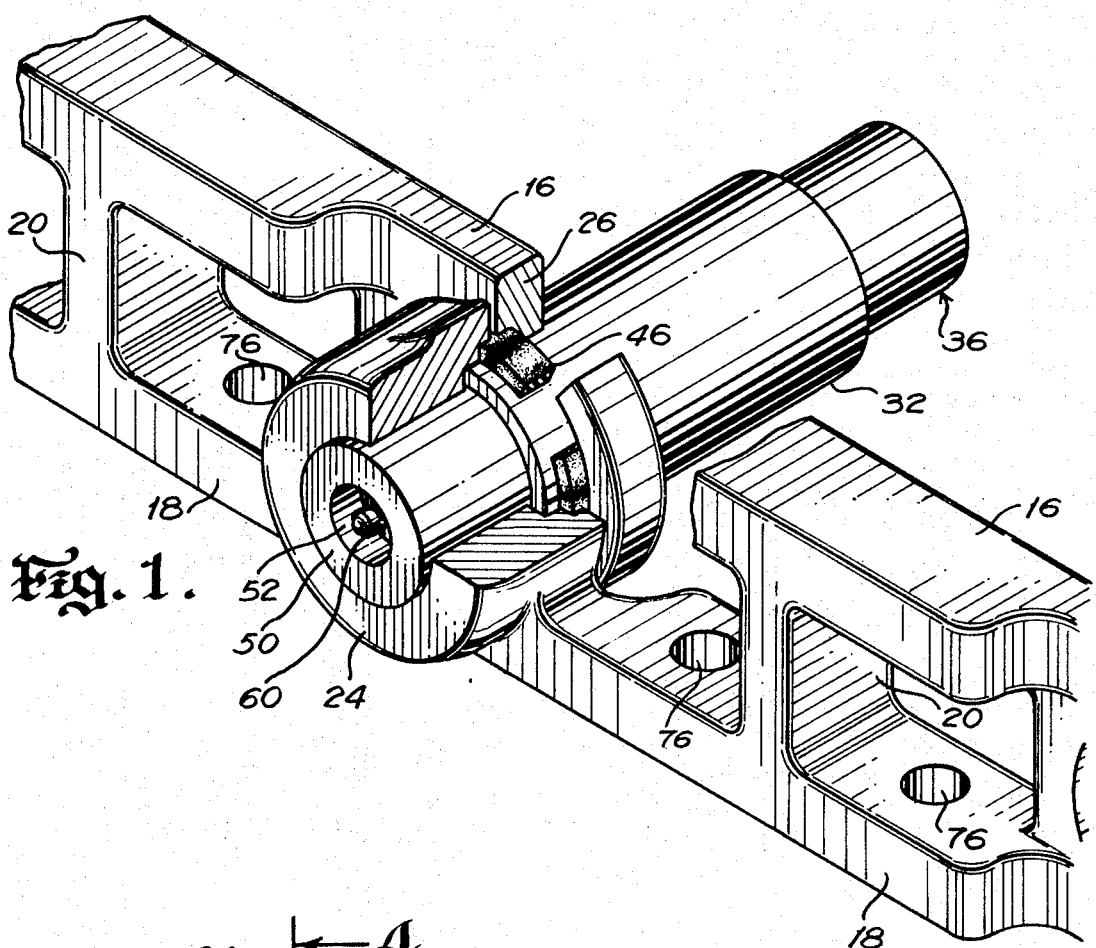
FIG. 1 is a perspective fragmentary view of two connecting links and illustrates the bushing, the pin in the bushing and the flexible seal encircling the bushing and between the two links.
Figure 3:
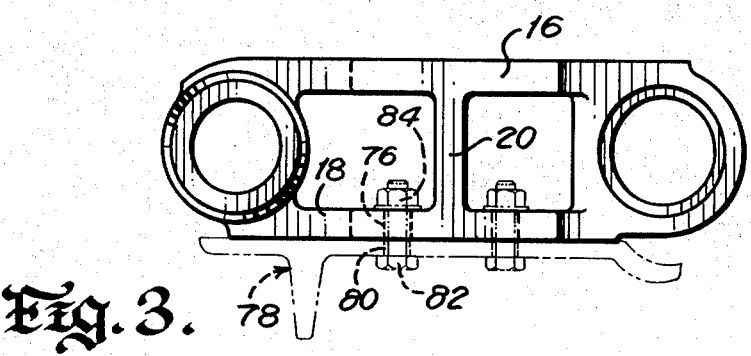
FIG. 3 is a side elevational view of a track assembly and illustrates, in phantom, the track shoe as attached to the track assembly.

In FIG. 1, 2 and 3 it is seen that in the outer member 18 there are two spaced apart passageways 76.

In FIG. 3, in phantom, there is a track shoe 78. The track shoe 78 has four spaced apart openings or passageways 80. The track shoe 78 is attached to a track assembly 10 by means of the four bolts 82 in the passageways 80 and 76 and by the nuts 84.

From the foregoing, it is seen that I have provided a lubrication system between successive or adjacent track assemblies 10 with the pin 36 in the bushing 32. With this lubrications system it is possible to achieve a longer life for the track comprising these track assemblies. There is less friction between the pins and bushings and also less possibility of extraneous material such as dirt, sand, mud or silt in water working between a pin and the bushing.

What I claim is:

1. A track assembly comprising:
   a. two spaced apart links;
   b. each of said links having a main body, an overlapping link on one end of said body and an inside link on the other end of said body;
   c. each inside link having a first passageway;
   d. a bushing positioned in said first passageway in said inside links and connecting said inside links;
   e. each overlapping link having a second passageway;
   f. a pin positioned in said second passageway in said overlapping links and connecting said overlapping links;
   g. a first recess in the outside surface of each said inside link;
   h. a second recess in the inside surface of each said overlapping link;
   i. a seal positioned in said recesses and extending between each of said overlapping links and said inside links; and,
   j. said seal being of a larger diameter than said bushing and encircling said bushing.

2. An assembly according to claim 1 and comprising:
   a. a third passageway in said pin terminating at the circumference of said pin and inside of the overlapping link; and,
   b. a means for introducing a lubricant into said third passageway.

3. A recess according to claim 1, and comprising:
   a. a third passageway in said pin terminating at the circumference of said pin and inside of the overlapping link;
   b. a means for introducing a lubricant into said third passageway; and,
   c. said seal being flexible and capable of yielding with relative movement between adjacent said inside link and said overlapping link.

4. A track comprising:
   a. a first track assembly and a second track assembly;
   b. each track assembly comprising two spaced apart links;
   c. each of said links having a main body, an overlapping link on one end of said body and an inside link on the other end of said body;
   d. each inside link having a first passageway;
   e. a bushing positioned in said first passageway in said inside links and connecting said inside links;
   f. each overlapping link having a second passageway;
   g. a pin positioned in said second passageway in said overlapping links and connecting said overlapping links.
   h. said track assemblies being connected with the pin of the first track assembly in the bushing of the second track assembly,
   i. a seal between the inside surface of said overlapping link of the first track assembly and the outside surface of said inside link of the second track assembly;
   j. said seal being of a larger diameter than said bushing end encircling said bushing;
   k. a first recess in the outside surface of each said inside link;
   l. a second recess in the inside surface of each said overlapping link;
   m. said first recess and said second recess being aligned;
   n. said seal being positioned in said first recess and in said second recess; and,
   o. said recesses being of larger diameter than the diameter of said bushing.

5. A track according to claim 4 and comprising:
   a. the external diameter of said pin being less than the internal diameter of said bushing so that said pin and said bushing are free to rotate with respect to each other;
   b. a third passageway in said pin terminating at the circumference of said pin and inside said bushing; and,
   a means for introducing a lubricant into said third passageway.

6. A track according to claim 4 and comprising:
   a. the external diameter of said pin being less than the internal diameter of said bushing so that said pin and said bushing are free to rotate with respect to each other;
   b. a third passageway in the pin and connecting with the end of the pin and the circumference of the pin;
   c. a grease fitting connecting with said third passageway in the end of the pin.

7. A pin according to claim 6 and comprising:
   a. a fourth passageway in the pin and connecting with the end of the pin and the circumference of the pin; and,
   b. a pressure release fitting connecting with said fourth passageway in the end of the pin.

8. A track according to claim 4 and comprising:
   a. the external diameter of said pin being less than the internal diameter of said bushing so that said pin and said bushing are free to rotate with respect to each other;

b. a third passageway in the pin and connecting with a first end of the pin and the circumference of the pin;

c. a grease fitting connecting with said third passageway in the first end of the pin;

d. a fourth passageway in the pin and connecting with a second end of the pin and the circumference of the pin;

e. a pressure release fitting connecting with said fourth passageway in the second end of the pin; and, f. said seal being flexible and capable of yielding with relative movement between adjacent said inside link and said overlapping link.

9. In a track assembly comprising:

a. two spaced apart links;

b. each of said links having a main body, an overlapping link on one end of said body and an inside link on the other end of said body;

c. each inside link having a first passageway;

d. a bushing positioned in said inside links and connecting said inside links;

e. each overlapping link having a second passageway;

f. a pin positioned in said second passageways in said overlapping links and connecting said overlapping links;

g. a first recess in the outside surface of each said inside link;

h. a second recess in the inside surface of each said overlapping link;

i. said recesses being of larger diameter than the diameter of said bushing;

j. a seal positioned in said recesses and extending between each of said overlapping links and said inside links; and, k. each inside link having a first passageway.

10. An assembly according to claim 9 and comprising:

a. a third passageway in said pin terminating at the circumference of said pin and inside of the overlapping link; and, b. a means for introducing a lubricant into said third passageway.

11. In a track comprising:

a. a first track assembly and a second track assembly;

b. each track assembly comprising two spaced apart links;

c. each of said links having a main body, an overlapping link on one end of said body and an inside link on the other end of said body.

d. each inside link having a first passageway;

e. a bushing positioned in said first passageways in said inside links and connecting said inside links;

f. each overlapping link having a second passageway;

g. a pin positioned in said second passageways in said overlapping links and connecting said overlapping links;

h. said track assemblies being connected with the pin of the first track assembly in the bushing of the second track assembly;

i. the external diameter of said pin being less than the internal diameter of said bushing so that said pin and said bushing are free to rotate with respect to each other;

j. a first recess in the outside surface of each said inside link;

k. a second recess in the inside surface of each said overlapping link;

l. said first recess and said second recess being aligned;

m. a seal between the inside surface of said overlapping link of the first track assembly and the outside surface of said inside link of the second track assembly, n. said seal being of a larger diameter than said bushing and encircling said bushing;

o. said seal being positioned in said first recess and in said second recess; and, p. said recess being of larger diameter than the diameter of said bushing.

12. A track according to claim 11 and comprising:

a. a third passageway in said pin terminating at the circumference of said pin and inside said bushing; and, b. a means for introducing a lubricant into said third passageway.

13. A track according to claim 11 and comprising:

a. a third passageway in the pin and connecting with the end of the pin and the circumference of the pin; and, b. a grease fitting connecting with said third passageway in the end of the pin.

14. A pin according to claim 13 and comprising:

a. a fourth passageway in the pin and connecting with the end of the pin and the circumference of the pin; and, b. a pressure release fitting connecting with said fourth passageway in the end of the pin.

* * * * *